No. 679,005. Patented July 23, 1901.
T. C. PROUTY.
HYDRAULIC COUPLING.
(Application filed Aug. 15, 1899.)
(No Model.)
-FIG. I-
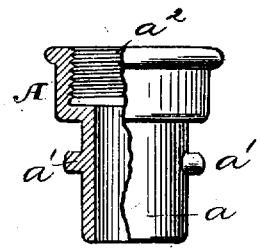
-FIG. II-
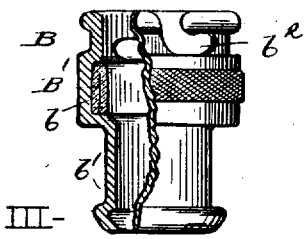
-FIG. III-
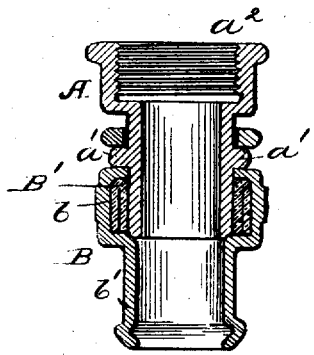
-FIG. VI-
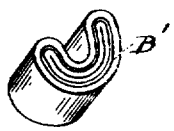
-FIG. V-
Witnesses
J. C. Turner
N. E. Merkel
Inventor,
T. C. Prouty
By J. D. Fay
Atty

UNITED STATES PATENT OFFICE.

THEODORE C. PROUTY, OF MIDLAND, MICHIGAN.

HYDRAULIC COUPLING.

SPECIFICATION forming part of Letters Patent No. 679,005, dated July 23, 1901.

Application filed August 15, 1899. Serial No. 727,264. (No model.)

*To all whom it may concern:*

Be it known that I, THEODORE C. PROUTY, a citizen of the United States, and a resident of Midland, county of Midland, and State of Michigan, have invented a new and useful Improvement in Hydraulic Couplings, of which the following is a specification, the principle of the invention being herein explained and the best mode in which I have contemplated applying that principle, so as to distinguish it from other inventions.

The object of my invention is to provide a cheap and effective coupling for hydraulic connections; and it consists of means hereinafter fully described.

The annexed drawings and the following description set forth in detail certain mechanism embodying the invention, such disclosed means constituting but one of various mechanical forms in which the principle of the invention may be used.

In said annexed drawings, Figure I represents a partial longitudinal sectional view of the male member of my improved coupling. Fig. II represents a partial longitudinal section of the female member of my improved coupling. Fig. III represents a longitudinal section of the two members of the coupling connected. Fig. IV represents a detail perspective view of the improved packing in my invention, illustrating its form before being inserted in the female member; and Fig. V represents a central longitudinal section of said packing.

The male member A consists of a nipple $a$, provided with two lugs $a'$, disposed diametrically opposite each other, and an internally-threaded portion $a^2$, adapted to be secured to a faucet or other threaded hydraulic duct. Said threaded portion may be replaced by any form of connection whereby the nipple may be secured to the desired water connection.

The female portion of the coupling consists of a tube B, provided with an interior groove $b$, in which is located a packing-ring B' of U-shaped cross-section in a manner such that the two portions of such section extend in the direction of the coupling axis, the open portion of such section being farthest removed from the coupled end of such female member. Said female member is further provided with a portion $b'$, which may be secured to the desired duct and which may be replaced by a threaded portion, such as is shown in the male member.

The coupled end of the female member is provided with angle-slots $b^2$, located diametrically opposite each other, which are adapted to receive the lugs $a$, formed on the nipple of the male member of the coupling, which may hence be secured against lateral displacement.

I have provided a one-piece female member, which not only has formed thereon its portion of the connecting means, (the angle-slots $b^2$,) but also has the internal groove $b$ of a fixed width, so that when the packing-ring is inserted it is held immovable in so far as movement longitudinally of the coupling is concerned. Owing to this construction, the movement by which the male and female members are coupled and uncoupled cannot under any circumstances change the position or shape of the ring, such as would occur in case one of the end walls of the groove was formed by a removable portion of the female member, especially if said removable portion formed part of the coupling means. In the latter case accidental binding of the parts, &c., would in uncoupling release the removable portion and allow of a change in position and shape of the ring in an obvious manner.

The diameter of the nipple of the male member is made substantially equal to that of the inner diameter of the packing-ring.

When the two members are secured, fluid passing through the joint so formed in trying to escape through the interstices formed by such connection pass into and between the two folded portions of the packing, whereby the latter is expanded against the outer surface of the nipple of the male member and the inner adjacent surface of the female member, thereby effectually sealing the connection against leakage.

The packing-ring B' is made of any desired flexible material used for packing purposes, and in being inserted into the female member is doubled up, as shown in Fig. IV, in order to be placed with facility in the groove $b$.

The above construction permits the formation of this connection without reducing the cross-sectional area of the duct in which said joint is formed and even permits the diameter of the packing to be slightly greater than the diameter of the male member, thereby permitting the latter to be easily inserted even in cases where obstructions in the form of refuse or other matter may have found its way upon the inner surface of the packing.

Other modes of applying the principle of my invention may be employed instead of the one explained, change being made as regards the mechanism herein disclosed, provided the means covered by any one of the following claims be employed.

The groove in the female member is formed contiguous to the interior of one extremity and is provided, as shown, with two transverse end surfaces distant from each other substantially the width of the packing-ring, whereby it is seen that the said ring is confined laterally in both directions of the coupling-axis, and hence cannot become displaced when the two members are coupled and is also securely confined in the female member when the two members are uncoupled, thereby preventing the loss of the ring and consequent inconvenience which would be occasioned thereby.

I therefore particularly point out and distinctly claim as my invention—

1. In a hydraulic coupling, the combination with a male, of a one-piece female member removably secured thereto, said female member being formed with an annular groove permanent as to size and position on the interior of one extremity and provided with a packing-ring located in said groove, said male member projecting into and engaging the inner surface of said ring, substantially as set forth.

2. In a hydraulic coupling, the combination with a male, of a one-piece female member removably secured thereto, said female member having an interior groove permanent as to size and position contiguous to one end opening and provided with a packing-ring in said groove, said male member fitting loosely in said opening and projecting into and interiorly engaging said ring, substantially as set forth.

3. In a hydraulic coupling, the combination with a male, of a one-piece female member removably secured thereto, said female member provided with a groove permanent as to size and position having a packing-ring located therein and confined in both directions of the coupling-axis by said groove, the outer surface of said male member engaging the inner surface of said ring, substantially as set forth.

4. In a hydraulic coupling, the combination with a male, of a female member provided with an interior annular groove permanent as to size and position and having located therein a packing-ring of U-shaped cross-section and substantially equal in width to said groove, the two portions of the U of such section extending in the direction of the coupling-axis, substantially as set forth.

Signed by me this 1st day of August, 1899.

THEODORE C. PROUTY.

Attest:
J. C. TURNER,
A. E. MERKEL.